United States Patent Office 3,101,030
Patented Aug. 20, 1963

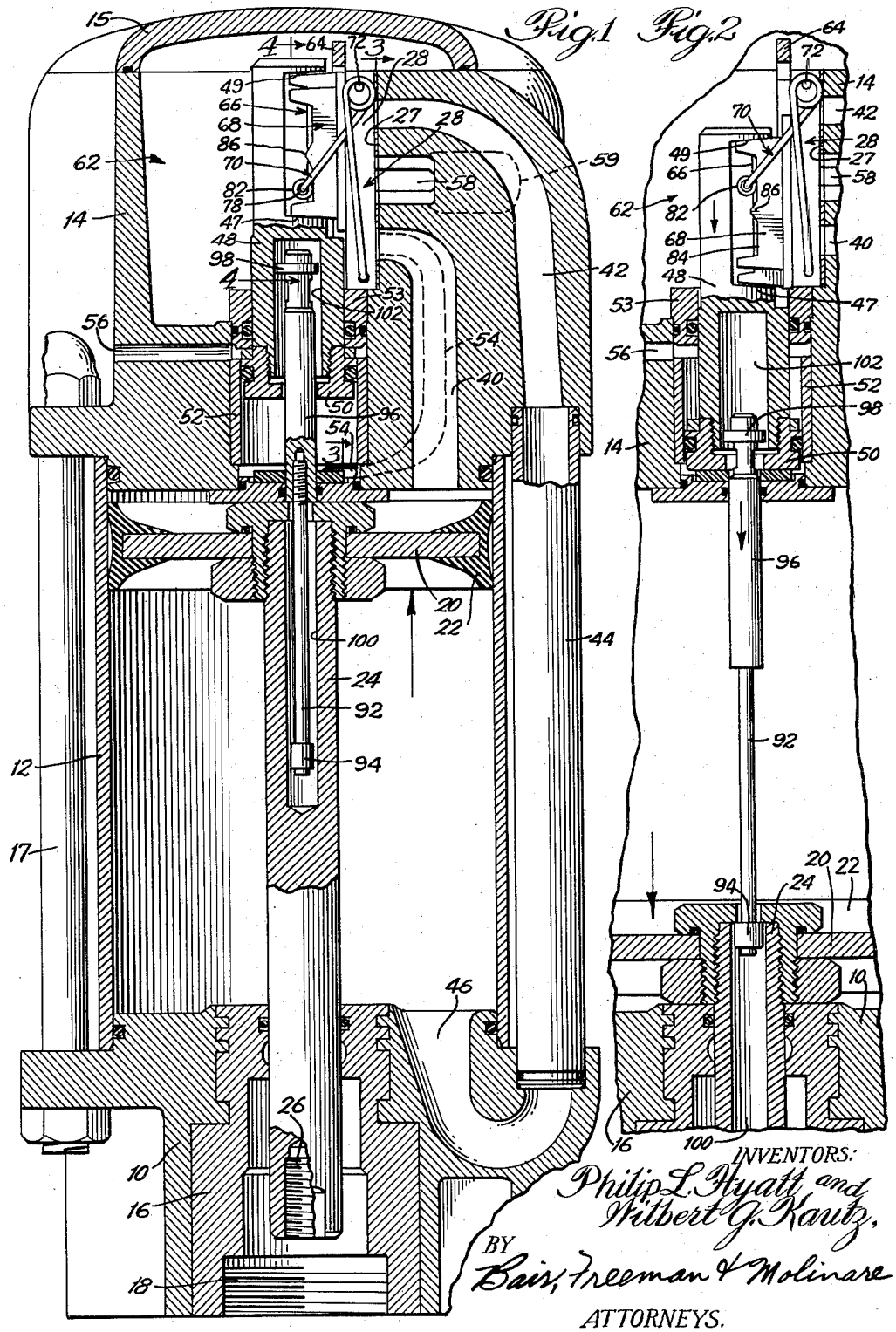

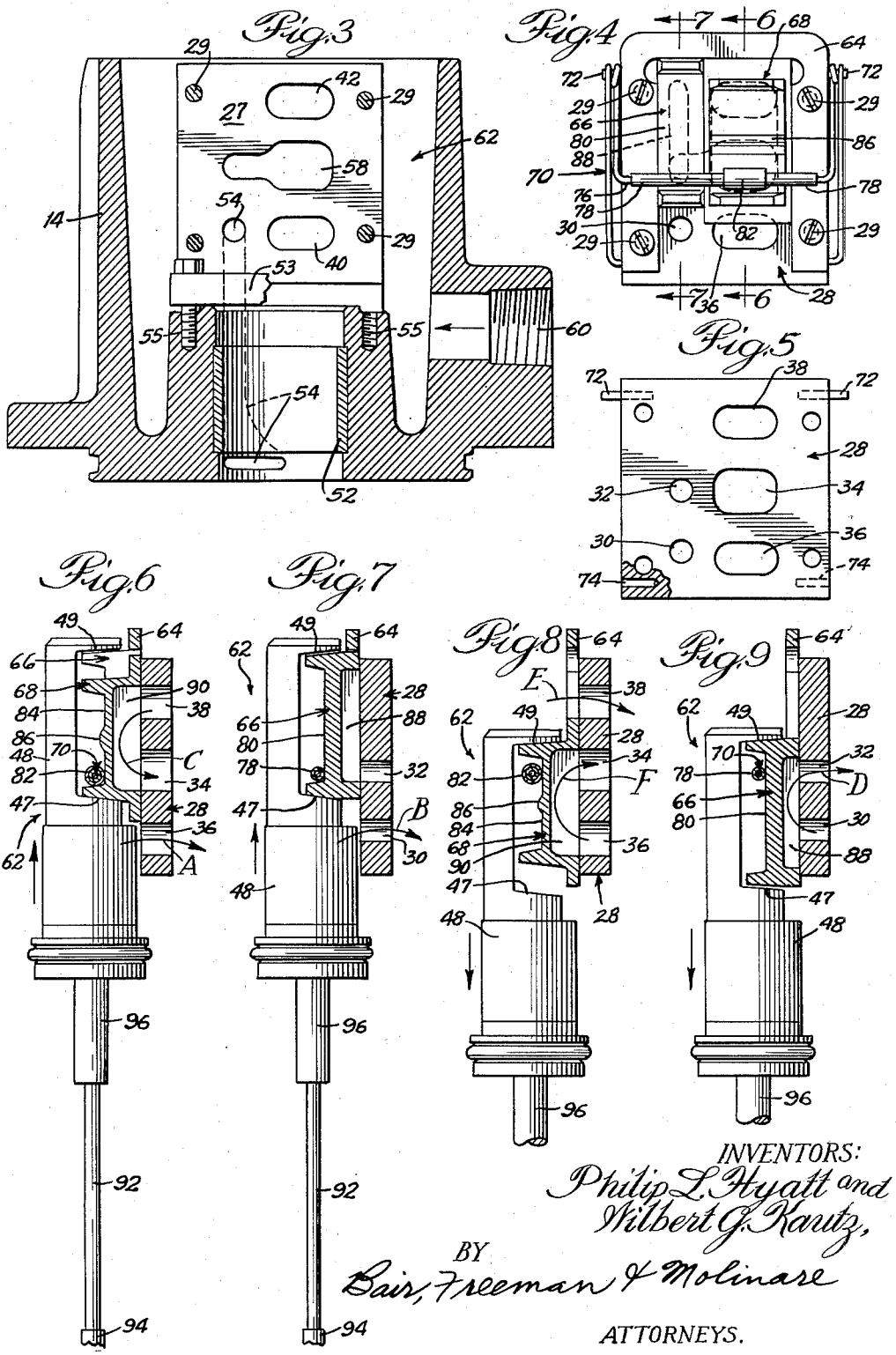

3,101,030
VALVE FOR PNEUMATIC MOTORS
Philip L. Hyatt, Bryan, and Wilbert G. Kautz, West Unity, Ohio, assignors to The Aro Corporation, a corporation of Ohio
Filed Sept. 1, 1961, Ser. No. 135,577
7 Claims. (Cl. 91—28)

This invention relates to a valve of pilot-assisted type for pneumatic motors.

One object of the invention is to provide a valve of this type which is comparatively simple and inexpensive to manufacture, and substantially foolproof in operation.

Another object is to provide a valve structure, the parts of which are readily accessible for servicing by removal of a cover plate from the head of an air motor.

Still another object is to provide a valve assembly including a valve plunger for operating a pilot valve and a main valve, the plunger having a head reciprocable in a valve cylinder in the head of the air motor, and the plunger retained in operative position by a gland adjacent a valve plate against which the main valve and the pilot valve are slid by the plunger, a valve spring being arranged to retain the valves against the valve plate assisted by air pressure within the head of the air motor.

A further object is to provide an operative connection between the air motor and the valve plunger to start its movement adjacent the ends of the stroke of the air motor whereupon the valve plunger is actuated by air pressure to finish the valve actuating stroke in substantially the same period of time regardless of the speed of reciprocation of the air motor.

Still a further object is to provide a valve spring so cooperating with a main valve and a pilot valve to retain them against dislocation and thus in position for proper operation at all times.

With these and other objects in view, our invention consists in the construction, arrangement and combination of the various parts of our valve for pneumatic motors, whereby the objects above contemplated are attained, as hereinafter more fully set forth, pointed out in our claims and illustrated in detail on the accompanying drawings, wherein:

FIG. 1 is a vertical sectional view through a pneumatic motor and our valving arrangement therefor showing the motor piston at its upper limit of movement.

FIG. 2 is a similar sectional view of the significant parts of the device showing the motor piston at its lower limit of movement.

FIG. 3 is a vertical sectional view through the head of the air motor as taken on the line 3—3 of FIG. 1.

FIG. 4 is a back view of the valves as viewed on the line 4—4 of FIG. 1.

FIG. 5 is an elevation of a valve plate used in our valve construction.

FIG. 6 is a partial sectional view of the valve and valve plate as in the position shown in FIG. 1, and illustrates particularly the main valve.

FIG. 7 is a similar view illustrating the pilot valve; and

FIGS. 8 and 9 are similar views illustrating the main valve and pilot valve respectively in a different position of operation.

On the accompanying drawings, we have used the reference numeral 10 to indicate an air motor base, 12 an air motor cylinder and 14 an air motor head. The base 10 and head 14 may be advantageously formed of aluminum alloy for weight minimization and economy, and the base and head may be connected by several tie rods 17. The base has an insert 16 of steel or the like. A cover plate 15 is provided as part of the head 14 and may be suitably bolted thereto with an O-ring seal as shown in FIG. 1 to prevent leakage. The insert 16 is threaded as at 18 for mounting on a pump (not shown) for lubricant or other material.

A piston disc 20 is reciprocable in the cylinder 12 and has a peripheral seal 22. A piston rod 24 depends from the piston 20 and passes through an O-ring in the insert 16, the lower end being threaded as at 26 for connection to a piston rod of a lubricant pump or the like, or to any device to be operated by the air motor.

Within the head 14 a valve plate 28 is provided, being secured to a vertical face 27 within the head by screws 29 (FIGS. 3 and 4). The valve plate 28 is provided with a pilot valve port 30 (see FIG. 5), a pilot valve exhaust port 32, a main valve exhaust port 34 and a pair of main valve ports 36 and 38. A cylinder top passage 40 in the head 14 and a cylinder bottom passage 42 also therein communicate with the ports 38 and 36 as shown in FIG. 1. The passage 42 also communicates with a cylinder bottom tube 44 and a second cylinder bottom passage 46 formed in the cylinder base 10.

A valve plunger 48 is provided having a valve plunger head 50. A valve cylinder 52 in the form of a steel insert in the head 14 is provided to receive the head 50. The plunger 48 slides through a valve plunger gland 53 held in position by a pair of screws (see FIG. 3). Thus the valve plunger 48 presents a differential area represented by the area of the plunger itself within the gland 53 and the larger area of the O-ring carried by the head 50 inside the cylinder 52, the purpose of which will hereinafter appear.

A valve cylinder passageway 54 leads from the space in the cylinder 52 to the pilot valve port 30 of FIG. 5, and a vent passageway 56 leads from between the head 50 and the gland 53 to atmosphere as shown in FIG. 1.

Referring to FIGS. 1, 3 and 5 the main valve exhaust port 34 as well as the pilot valve exhaust port 32 communicate with an exhaust cavity 58 (see FIG. 3) leading to an exhaust opening 59 (see FIG. 1). Similarly an inlet opening 60 shown in FIG. 3 leads into an air pressure chamber 62 in the air motor head 14 and its cover plate 15.

In FIG. 4 a U-shaped valve guide 64 is shown secured over the valve plate 28 by the screws 29, and a main valve 68 and a pilot valve 66 of the cross section in FIGS. 6 and 7 respectively are slidable on the valve plate between the sides of the valve guide. A valve spring 70 normally retains the valves in position against the valve plate, the spring being wrapped around a pair of pins 72 projecting from the valve plate as shown in FIGS. 4 and 5 and having inturned ends entering sockets 74 of the valve plate. The spring 70 has a cross member 76 behind the valves provided with two tubes 78 which act as spacers for a roller 82 which contacts the back surface 84 of the main valve 68. The surface 84 has a projection 86 thereon to prevent stalling of the main valve, and which cooperates with the roller 82 as will hereinafter appear. The pilot valve 66 and the main valve 68 have cavities 88 and 90 respectively for cooperation with the ports of the valve plate 28. A valve rod 92 is provided having a head 94, and a second valve rod 96 forms an extension thereof and has a head 98. The head 94 is located in a bore 100 of the piston rod 24 whereas the head 98 is located in a bore 102 of the plunger 48.

*Practical Operation*

In the operation of our valve assembly, assuming the parts to be in the position of FIGS. 1, 4, 6 and 7, the constant air pressure within the air pressure chamber 62 may flow as indicated by the arrows A and B to enter the passages 40 and 54 respectively. The air pressure through the passage 40 acts on the top of the air motor piston 20 to drive the piston downwardly whereas the air pressure through the passageway 54 acts within the valve cylinder 52 to raise the valve operating plunger 48 to the position shown. The vent 56 permits in-and-out "breathing" as required because of the difference in areas of the plunger 48 and its head 50.

As the piston 20 lowers in the cylinder 12 it picks up the head 94 after a certain degree of lost motion and the head 98 in turn picks up the valve plunger head 50 to start the valve actuating movement of the plunger 48. It will be noted in FIG. 6 there is considerable lost motion between a pair of shoulders 47 and 49 of the plunger 48 and the main valve 68 whereas the play between these shoulders and the pilot valve 66 as shown in FIG. 7 is very slight. Accordingly the first downward movement of the plunger 48 carries the pilot valve with it while the main valve remains behind due to the friction thereof against the valve plate 28. The pilot valve therefore will first change positions as shown in FIG. 9 to exhaust air from the valve cylinder 52 through the passageway 54, the port 30, the cavity 88, the port 32, the exhaust cavity 58 and the exhaust opening 59. The space within the cylinder 52 is then at atmospheric pressure whereby the pressure in the pressure chamber 62 acting on the plunger 48 drives it downwardly as to the position shown in FIG. 2, and in so doing changes the position of the main valve 66 as shown in FIG. 8. Thereupon air will flow according to the arrow E over the top of the main valve 68 past the valve guide 64, and through the port 38 and the passages 42, 44 and 46 to the cylinder 12 below the piston 20 to force it in the upward direction whereas the air displaced from above the piston 20 flows through the passageway 40 and the port 36 as indicated by the arrow F through the valve cavity 90 and out through the port 34, the exhaust cavity 58 and the exhaust opening 59.

The motor piston 20 will now travel upwardly in the cylinder 12 and adjacent the top end of the stroke the lower end of the rod 96 will be engaged by the top of the piston 20, and the valve rod 92—96 will be elevated until the top end of 96 engages the upper end of the bore 102 and starts the valve plunger 48 upwardly. This again will result in initial upward movement of the pilot valve 66 immediately to result in repositioning as in FIG. 7 whereupon the pilot valve will be raised by air pressure introduced under the head 50 of plunger 48 and the cycle restarted, followed by positioning of the main valve 68 as in FIG. 6 whereupon the foregoing described cycle is repeated for imparting another reciprocation (and continued reciprocations until such time as the pump attached to the piston rod 24 is stopped as by closing the outlet valve, grease nozzle or the like).

Adjacent the center of the stroke of the main valve 68 with respect to the valve plate 28 the motor is prevented from stalling by reason of the projection 86 and the roller 82 cooperating therewith. The spring 70 serves two purposes. First; it retains both valves 66 and 68 in their approximate positions during shipping and handling of the air motor while the head 14 is not charged with compressed air. Second; it prevents (through the roller 82) the valve 68 from falling, bouncing, or being moved by small friction forces to such a position that it covers both ports 36 and 38 simultaneously, thus causing the motor to stall. When the head 14 is charged with compressed air, the pressure thereof holds both valves 66 and 68 in proper operating position engaging the valve plate 28.

From the foregoing specification, it will be obvious that our valve construction is comparatively simple and inexpensive to manufacture and service. Servicing can be conveniently accomplished by removal of the cover plate 15 whereupon the main and pilot valves are readily accessible, and the gland 53 can be removed to permit removal of the valve plunger 48 for the purpose of renewing O-ring seals, worn parts or for other purposes. Throughout the construction, several O-ring seals have been used as illustrated in FIGS. 1 and 2 but have not been described in detail.

Some changes may be made in the construction and arrangement of the parts of our valve for pneumatic motors without departing from the real spirit and purpose of our invention, and it is our intention to cover by our claims any modified forms of structure or use of mechanical equivalents which may reasonably be included within their scope.

We claim as our invention:

1. In a valve for reciprocating pneumatic motors, a head for the motor, a pressure chamber therein, a single valve cylinder in said head, a valve plunger entering said cylinder and having a head thereon within said cylinder of greater area than said valve plunger to provide differential areas for operating said valve plunger, a lost motion connection from the pneumatic motor to said valve plunger, a ported valve plate within said pressure chamber having main ports communicating with opposite ends of the pneumatic motor and an exhaust port, said valve plate having a pilot port communicating with said valve cylinder and a pilot exhaust port, a main valve and a pilot valve slidable on said valve plate, said valve plunger being operatively connected with said valves for shifting them over the surface of said valve plate, the operative connection being such that both said main valve and said pilot valve may move laterally relative to said surface, the operative connection for said main valve including a lost motion connection, and biasing means operable to retain both of said valves adjacent said surface of said valve plate when there is no pressure in said pressure chamber.

2. In a valve for reciprocating pneumatic motors, a head for the motor, a pressure chamber therein, a valve cylinder in said head, a valve plunger entering said valve cylinder and having a head thereon within said cylinder of greater area than said valve plunger to provide differential areas for operating said valve plunger, a lost motion connection from the pneumatic motor to said valve plunger, a ported valve plate within said pressure chamber having main ports communicating with opposite ends of the pneumatic motor and an exhaust port, said valve plate having a pilot port communicating with said valve cylinder and a pilot exhaust port, and a main valve and a pilot valve slidable on a surface of said valve plate, said valve plunger being operatively connected with said valves for shifting them along said surface, the operative connection for said valves being constructed and arranged to permit said valves to move normal to said surface and the operative connection for the main valve including a lost motion connection.

3. In a valve for reciprocating pneumatic motors, a head for the motor, a pressure chamber therein, a valve cylinder in said head, a valve plunger entering said cylinder and having a head thereon within said cylinder of greater area to provide differential areas for operating said valve plunger, a lost motion connection from the pneumatic motor to said valve plunger, a ported valve plate within said pressure chamber having main ports communicating with opposite ends of the pneumatic motor and an exhaust port, said valve plate having a pilot port communicating with said valve cylinder and a pilot exhaust port, a main valve and a pilot valve slidable on said valve plate, said valve plunger being operatively connected with said valves for shifting them on said valve plate, the operative connection for the main valve including a lost motion connection, and a valve spring operable to engage said main valve with said valve plate and retain said pilot valve thereadjacent during the absence of pressure in said pressure chamber.

4. A pilot assisted valve for a reciprocating pneumatic motor comprising a head for the motor, a valve cylinder in said head, a valve plunger entering said valve cylinder and having a head thereon within said cylinder, a lost motion connection from the pneumatic motor to said valve plunger, a gland secured in said head surrounding said valve plunger, the area of said cylinder and said head on said valve plunger being greater than the area of said plunger, a ported valve plate within said pressure chamber having main ports communicating with opposite ends of the pneumatic motor and an exhaust port, said valve plate having a pilot port communicating with said valve cylinder and an exhaust port, a main valve and a pilot valve slidable on said valve plate for shifting them on said valve plate, said valve plunger having a notch receiving said valves, said pilot valve substantially filling said notch and said main valve being shorter than said notch, a valve spring operable to retain said valves adjacent said valve plate, and a vent passage in said motor head from said cylinder between said head of said valve plunger and said gland.

5. A pilot assisted valve for a reciprocating pneumatic motor comprising a head for the motor, a valve cylinder in said head, a valve plunger entering said valve cylinder and having a head thereon within said cylinder, a lost motion connection from the pneumatic motor to said valve plunger, a gland secured in said head surrounding said valve plunger, the area of said cylinder and said head on said valve plunger being greater than the area of said plunger, a ported valve plate within said pressure chamber having main ports communicating with opposite ends of the pneumatic motor and an exhaust port, said valve plate having a pilot port communicating with said valve cylinder and an exhaust port, a main valve and a pilot valve slidable on said valve plate for shifting them on said valve plate, said valve plunger having a notch receiving said valves, said pilot valve substantially filling said notch and said main valve being shorter than said notch, and a valve spring operable to retain said valves adjacent said valve plate.

6. A pilot assisted valve for a reciprocating pneumatic motor comprising a head for the motor, a single valve cylinder in said head, a valve plunger entering one end of said valve cylinder within said head and having a head thereon within said cylinder, a lost motion connection from the pneumatic motor to said valve plunger, a gland in said end surrounding said valve plunger, the area of said head on said valve plunger being greater than the area of said plunger, means for venting the space in said cylinder between said gland and said head to atmosphere, means for pressurizing the interior of said head during operation of the pneumatic motor, a ported valve plate within said pressure chamber having main ports communicating with opposite ends of the pneumatic motor and an exhaust port, said valve plate having a pilot port communicating with said valve cylinder and an exhaust port, and a main valve and a pilot valve slidable on said valve plate, said valve plunger having means to cooperate with said valves for shifting them on said valve plate.

7. A pilot assisted valve for a reciprocating pneumatic motor comprising a head for the motor, a valve cylinder in said head, a valve plunger entering said valve cylinder and having a head thereon within said cylinder, a lost motion connection from the pneumatic motor to said valve plunger, a gland secured in said head surrounding said valve plunger, the area of said cylinder and said head on said valve plunger being greater than the area of said plunger, a ported valve plate within said pressure chamber having main ports communicating with opposite ends of the pneumatic motor and an exhaust port, said valve plate having a pilot port communicating with said valve cylinder and an exhaust port, a main valve and a pilot valve slidable on said valve plate for shifting them on said valve plate, said valve plunger having a notch receiving said valves, said pilot valve substantially filling said notch, and a U-shaped valve spring having its cross member behind said valves to retain them in proximity to said valve plate and said main valve engaged therewith.

References Cited in the file of this patent

UNITED STATES PATENTS

| Re. 3,885 | Hubbard et al. | Mar. 22, 1870 |
|---|---|---|
| 2,597,443 | Broughton | May 20, 1952 |
| 2,750,932 | Klein | June 19, 1956 |
| 2,944,528 | Phinney | July 12, 1960 |